(12) United States Patent
Chopinez et al.

(10) Patent No.: US 8,852,747 B2
(45) Date of Patent: Oct. 7, 2014

(54) COEXTRUSION BINDERS ON A RENEWABLE/BIODEGRADABLE BASIS

(75) Inventors: Fabrice Chopinez, Evreux (FR); Johann Laffargue, Plasnes (FR); Jeau-Laurent Pradel, Boisney (FR); Damien Rauline, Saint-Quentin-des-Isles (FR); Samuel Devisme, Rouen (FR)

(73) Assignee: Arkema France, Colombes (FR)

( * ) Notice: Subject to any disclaimer, the term of this patent is extended or adjusted under 35 U.S.C. 154(b) by 989 days.

(21) Appl. No.: 12/599,872

(22) PCT Filed: May 14, 2008

(86) PCT No.: PCT/FR2008/050834
§ 371 (c)(1),
(2), (4) Date: Jun. 30, 2010

(87) PCT Pub. No.: WO2008/149019
PCT Pub. Date: Dec. 11, 2008

(65) Prior Publication Data
US 2010/0266858 A1   Oct. 21, 2010

Related U.S. Application Data

(60) Provisional application No. 60/939,965, filed on May 24, 2007.

(30) Foreign Application Priority Data

May 14, 2007   (FR) ...................................... 07 55052

(51) Int. Cl.
| | | |
|---|---|---|
| B32B 15/04 | (2006.01) | |
| B32B 15/08 | (2006.01) | |
| B32B 15/09 | (2006.01) | |
| B32B 27/08 | (2006.01) | |
| B32B 27/18 | (2006.01) | |
| B32B 27/22 | (2006.01) | |
| B32B 27/30 | (2006.01) | |
| B32B 27/34 | (2006.01) | |
| B32B 27/36 | (2006.01) | |
| B32B 27/02 | (2006.01) | |
| B32B 27/04 | (2006.01) | |
| C08L 51/00 | (2006.01) | |
| C08L 51/02 | (2006.01) | |
| C08L 67/02 | (2006.01) | |
| C08L 67/04 | (2006.01) | |
| C08L 3/00 | (2006.01) | |
| C08L 101/08 | (2006.01) | |
| C08J 5/18 | (2006.01) | |
| B32B 27/06 | (2006.01) | |
| C08L 101/16 | (2006.01) | |
| C08L 101/00 | (2006.01) | |
| C08L 23/08 | (2006.01) | |
| C08L 3/04 | (2006.01) | |
| C08L 51/08 | (2006.01) | |
| C08L 71/02 | (2006.01) | |
| C08L 55/02 | (2006.01) | |

(52) U.S. Cl.
CPC .................. C08L 101/08 (2013.01); C08L 3/00 (2013.01); C08J 5/18 (2013.01); C08J 2300/16 (2013.01); C08J 2367/04 (2013.01); B32B 27/06 (2013.01); C08L 23/0846 (2013.01); C08L 2201/06 (2013.01); C08L 3/04 (2013.01); C08L 67/02 (2013.01); C08L 23/0869 (2013.01); C08L 51/00 (2013.01); C08L 51/08 (2013.01); C08L 101/16 (2013.01); C08L 67/04 (2013.01); C08L 71/02 (2013.01); C08L 55/02 (2013.01); C08L 101/00 (2013.01)
USPC ..... 428/480; 428/458; 428/474.7; 428/475.2; 428/483; 428/522; 428/532; 525/63; 525/64; 525/66; 525/70; 525/71; 525/54.1; 525/54.2; 525/54.24; 525/54.3; 525/165; 525/166; 525/178; 525/437; 525/444; 525/450; 525/461; 525/466

(58) Field of Classification Search
None
See application file for complete search history.

(56) References Cited

U.S. PATENT DOCUMENTS 5,108,844 A * 4/1992 Blemberg et al. .............. 428/518
5,346,936 A * 9/1994 Buehler et al. .................. 524/47
(Continued)

FOREIGN PATENT DOCUMENTS

JP   2007-284568   * 11/2007
WO   WO 9747670   12/1997

OTHER PUBLICATIONS

Wu C-S: "Physical properties and biodegradability of maleated-polycaprolactone/starch composite", Polymer Degradation and Stability, Barking, GB, vol. 80, No. 1, 2002, pp. 127-134.

(Continued)

Primary Examiner — Vivian Chen
(74) Attorney, Agent, or Firm — Buchanan Ingersoll & Rooney P.C.

(57) ABSTRACT

The invention relates to coextrusion binders including renewable and/or biodegradable polymers having good adhesion properties: at least one renewable and/or biodegradable polymer (A) grafted with a functional monomer including at least one reactive function, the grafting ratio being <1% in weight of the grafted polymer (A); at least one non-grafted renewable and/or biodegradable polymer (B) identical to (A) or compatible with (A) optionally a softener (C); and optionally a starch-based material (D). The invention also relates to multilayered structures including the binder of the present invention, in which the layers are preferably made of renewable and/or biodegradable compounds. The multilayered structures are advantageously useful in the field of food packaging.

17 Claims, No Drawings

(56) References Cited

U.S. PATENT DOCUMENTS

| | | | | |
|---|---|---|---|---|
| 5,391,423 | A * | 2/1995 | Wnuk et al. | 428/217 |
| 5,498,650 | A * | 3/1996 | Flexman et al. | 524/114 |
| 5,500,465 | A * | 3/1996 | Krishnan et al. | 524/47 |
| 5,714,573 | A * | 2/1998 | Randall et al. | 528/354 |
| 5,883,199 | A * | 3/1999 | McCarthy et al. | 525/437 |
| 5,939,467 | A * | 8/1999 | Wnuk et al. | 523/128 |
| 5,945,480 | A | 8/1999 | Wang et al. | |
| 5,952,433 | A | 9/1999 | Wang et al. | |
| 6,075,118 | A | 6/2000 | Wang et al. | |
| 6,114,495 | A * | 9/2000 | Kolstad et al. | 528/354 |
| 6,124,384 | A * | 9/2000 | Shiraishi et al. | 524/35 |
| 6,150,438 | A * | 11/2000 | Shiraishi et al. | 524/35 |
| 6,184,298 | B1 * | 2/2001 | Lee | 525/240 |
| 6,211,325 | B1 * | 4/2001 | Sun et al. | 528/66 |
| 6,552,162 | B1 | 4/2003 | Wang et al. | |
| 6,767,961 | B1 | 7/2004 | Wang et al. | |
| 6,844,077 | B2 * | 1/2005 | Squier et al. | 428/457 |
| 7,332,119 | B2 * | 2/2008 | Riebel | 264/299 |
| 7,566,753 | B2 * | 7/2009 | Randall et al. | 525/190 |
| 7,595,363 | B2 * | 9/2009 | Uradnisheck et al. | 525/162 |
| 7,604,859 | B2 * | 10/2009 | Liu et al. | 428/370 |
| 8,003,731 | B2 * | 8/2011 | Seeliger et al. | 525/166 |
| 2003/0162013 | A1 | 8/2003 | Topolkaraev et al. | |
| 2005/0215672 | A1 * | 9/2005 | Mohanty et al. | 524/9 |
| 2007/0203261 | A1 * | 8/2007 | Narayan et al. | 523/205 |
| 2009/0110942 | A1 | 4/2009 | Henderson-Rutgers et al. | |
| 2011/0196114 | A1 * | 8/2011 | Le et al. | 526/75 |
| 2011/0287204 | A1 * | 11/2011 | Devisme et al. | 428/36.9 |
| 2012/0021156 | A1 * | 1/2012 | Devisme et al. | 428/36.9 |

OTHER PUBLICATIONS

Dubois, P., et al: "Biodegradable compositions by reactive processing of aliphatic polyester/polysaccharide blends", Macromolecular Symposia, Wiley VCH Verlag, Weinheim, DE, Jan. 1, 2003, pp. 233-243.

Carlson, D. et al: "Maleation of Polyactide (PLA) by Reactive Extrusion", Journal of Applied Polymer Science, John Wiley and Sons Inc., New York, U.S., vol. 72, No. 4, Apr. 25, 1999, pp. 477-485.

Lee S-H; Ohkita, T: "Mechanical and thermal flow properties of wood flour—biodegradable polymer composites", Journal of Applied Polymer Science, vol. 90, 2003, pp. 1900, 1905.

Wu, et al: "A new biodegradable blends prepared from polyactide and hyaluronic acid", Polymer, Elsevier Science Publishers B.V., GB, vol. 46, No. 23, Nov. 14, 2005, pp. 10017-10026.

* cited by examiner

COEXTRUSION BINDERS ON A RENEWABLE/BIODEGRADABLE BASIS

BACKGROUND OF THE INVENTION

The invention relates to ties which can be used in coextrusion, comprising biorenewable and/or biodegradable polymers that have good adhesion properties, these ties being used in multilayer structures. The various layers are preferably made with biorenewable and/or biodegradable compounds or compositions. These multilayer structures are advantageously used in the field of food packaging.

The term "biorenewable or renewable" applies to a natural resource, the stock of which may be regenerated over a short period on the human scale. In this case, the renewable-based materials correspond to organic materials whose carbons come from non-fossil resources (see ASTM D 6866).

The term "biodegradable" applies to a material that is degraded by microorganisms. The result of this degradation is the formation of water, $CO_2$ and/or $CH_4$ and, optionally, by-products (residues, new biomass) that are not toxic for the environment.

The (renewable—or biodegradable-based) "biopolymer" market is expanding rapidly, especially in food packaging. This expansion is due to the need to find an alternative to fossil materials and to reduce pollution. The potentiality of biorenewable and/or biodegradable polymers, for example polylactides or polyhydroxy alkanoates, no longer has to be proved. These polymers have a limited impact on the environment in comparison with polymers resulting from non-biodegradable fossil resources. Biorenewable polymers make it possible to limit the consumption of fossil materials and to make use of resources originating from the growing of plants. Biodegradable polymers are themselves rapidly converted to products which may, partly or completely, be absorbed by the plants present in the environment.

However, these biopolymers taken separately cannot fulfil all the specifications generally demanded in the packaging industry. Specifically, in this sector, the structures used must have, in particular, mechanical properties, barrier properties to water and to gas and/or sufficient weldability.

PRIOR ART

To reach the standard of properties required (mechanical properties, barrier properties to water and to gas and/or weldability, etc.), it is therefore useful to combine these biopolymers in multilayer structures with at least one layer of another material (a biorenewable or non-biorenewable and/or biodegradable or non-biodegradable material). Since these others materials are generally incompatible with biorenewable or biodegradable polymers, the use of ties may be advantageous.

For example, document WO 0 452 646 A1 claims barrier and biodegradable multilayer structures of biodegradable polyester/starch-based material/biodegradable polyester type. Despite being completely biodegradable, the barrier properties of these structures to water are limited, which prevents the use thereof for the packaging of many foodstuffs. In this structure, no tie is used: the adhesion between the various layers is not very satisfactory.

On the other hand, in documents JP 2001/347 623 and JP 2005/343 098, multilayer structures comprising ties are described (e.g. PLA/tie/EVOH/tie/PLA). Said ties based on polyolefins (for example, EVA) make it possible to ensure a good cohesion between the PLA layer and the barrier (EVOH) layer. The barrier properties to water are satisfactory, but the ties used do not originate from biorenewable and/or biodegradable resources, which leads to environmental impact problems identical to those cited previously.

It is therefore necessary to find compositions which can be used as ties in the multilayer structures, these compositions having a lower environmental impact than the current ties based on non-renewable and non-biodegradable polymers.

BRIEF DESCRIPTION OF THE INVENTION

The Applicant has now found novel compositions, used as coextrusion ties, which have a limited environmental impact in comparison with the ties manufactured from polymers originating from fossil materials, these compositions being partially or completely based on biorenewable and/or biodegradable polymers and comprising (the total making 100%):

1 to 99% by weight and advantageously 10 to 90% of at least one biorenewable and/or biodegradable polymer (A), grafted with a functional monomer comprising at least one reactive function, the grafting ratio being preferably <1% by weight of grafted polymer (A);

99 to 1% by weight and advantageously 10 to 90% of at least one ungrafted biorenewable and/or biodegradable polymer (B), identical to (A) or compatible with (A);

0 to 50% by weight of a component (C) being used to soften said composition and advantageously 2 to 35%; and 0 to 50% by weight of a material (D) comprising starch and advantageously 0 to 35%.

Grafting functional molecules onto biorenewable and/or biodegradable polymers or polymer blends is described in a series of patents or patent applications from Kimberly & Clark (U.S. Pat. Nos. 6,552,124 B2, 6,579,934 B1, US 2003/0232929 A1). The main objective is to reinforce the hydrophilic nature of the materials and their affinity, especially with regard to biologically active materials. The targeted applications are mainly disposable absorbent products.

In Patent EP 1 000 102 B1, compositions based on modified polylactide and PVOH are described for making biodegradable films and fibres. In this invention, the ratio of grafted molecules must be above 1 wt %. It relates to compositions where the ratio of grafted molecules is between 1 and 20 wt %. This invention relates to a grafting ratio that is much lower as it is <1 wt %.

The use of compositions comprising biorenewable and/or biodegradable polymers modified by grafting as a tie is not described in any of these documents. However, surprisingly, the composition according to the invention has properties of adhesion with many supports, which enables the formation of multilayer structures.

According to one version of the invention, the composition comprises, relative to its total weight:

from 20 to 73% by weight of grafted polymer (A);
from 20 to 73% by weight of polymer (B);
from 5 to 25% by weight of compound (C);
from 2 to 20% by weight of a material (D).

The amount of the grafted monomer in the polymer (A) modified by grafting is preferably less than 0.98% by weight of the grafted polymer (A) and more preferably between 0.1 and 0.9% by weight.

Advantageously, the polymer (A) is a biorenewable and/or biodegradable polyester.

According to one preferred embodiment, the polymer (A) is chosen from polylactides, and more preferably from polymers and copolymers of lactic acid (PLA) and polymers and copolymers of glycolic acid (PGA).

According to a second embodiment, the polymer (A) is chosen from polyhydroxyalkanoate homopolymers or copolymers (PHA), polyalkylene succinates (PAS), polybutylene succinate adipate (PBSA), polybutylene adipate terephthalate (PBAT), polycaprolactone (PCL), polytrimethylene terephthalate (PTT) and thermoplastic starch (TPS).

According to a third embodiment, the polymer (A) is chosen from polyethylene succinate (PES) polybutylene succinate (PBS), polyhydroxybutyrate (PHB), hydroxybutyrate-valerate copolymers (PHBV) such as poly(3-hydroxybutyrate)/poly(3-hydroxyvalerate), hydroxybutyrate/hexanoate copolymers (PHBHx) and hydroxybutryrate/hexanoate copolymers (PHBO).

Preferably, the functional grafting monomer is chosen from unsaturated carboxylic acids or functional derivatives thereof.

According to one embodiment of the invention, the functional grafting monomer is chosen from:
  (i) acrylic, methacrylic, maleic, fumaric or itaconic acids; and
  (ii) anhydrides, ester derivatives, amide derivatives, imide derivatives and metal salts of said acids.

Very preferably, the functional grafting monomer is maleic anhydride.

The polymer (B) is preferably chosen from polylactides and very preferably from polymers and copolymers of lactic acid (PLA) and polymers and copolymers of glycolic acid (PGA).

Regarding the softening component (C) which has the role of making the composition more flexible, this is a polymer, an oligomer, a prepolymer or a molecule having at feast 5 carbon atoms.

Mention may be made, as preferred softeners, of:
  polyethers such as polyethylene glycol (abbreviated to PEG) or polytrimethylene ether glycol (abbreviated to PO3G);
  core-shell type compounds;
  copolymers or blends of copolymers of ethylene of unsaturated carboxylic acid ester or vinyl ester, and optionally of other unsaturated functional monomers such as maleic anhydride (MAH), glycidyl methacrylate (GMA), acrylic or methacrylic acid; and
  copolymers or blends of copolymers of ethylene and of α-olefin that are grafted with a functional monomer comprising at least one reactive function group, the α-olefins having 3 to 30 carbon atoms.

Among the materials (D) comprising starch, mention may be made, as a preferred material, of thermoplastic starch.

Another subject of the invention is a multilayer structure comprising at least one tie layer (L) according to the invention.

Advantageously, the layer (L) is directly linked to a layer (X), said layer (X) preferably being compatible with the tie layer (L). The layer (X) is more preferably still a layer of biorenewable and/or biodegradable polymer or of a blend of partially or completely biorenewable and/or biodegradable polymers.

One preferred structure according to the invention is of the layer (X)/layer (L)/layer (Y) type. The layer (L) is directly linked to a layer (X) on the one hand and is also directly linked to a layer (Y) on the other hand, said layer (X) being compatible with the layer (L). Regarding the layers (X) and (Y) of this structure, it is possible to have the following cases:
  the layer (X) and the layer (Y) are partially or completely biorenewable and/or biodegradable;
  the layer (X) and the layer (Y) are not biorenewable and/or not biodegradable (for example, a polyethylene layer);
  the layer (X) is partially or completely biorenewable and/or biodegradable and the layer (Y) is not biorenewable and/or biodegradable; and
  the layer (Y) is partially or completely biorenewable and/or biodegradable and the layer (X) is not biorenewable and/or biodegradable.

Preferably, the multilayer structure contains a layer (Y) having a nature different from the layer (X). This layer (Y) is advantageously chosen from:
  (i) a layer of a biorenewable and/or biodegradable polymer or of a blend of partially or completely biorenewable and/or biodegradable polymers;
  (ii) a layer of nitrogen-containing or oxygen-containing polar resin such as a layer of resin chosen from polyamides, copolyamides, saponified vinyl acetate/ethylene copolymers (abbreviated to EVOH), polyesters and copolyesters of renewable and/or biodegradable nature or mixtures thereof; and
  (iii) a metal layer.

Surprisingly, a sufficient adhesion is obtained with these various types of (Y) layers to obtain structures that can advantageously be used in packagings.

Preferably, the layer (X) is a layer of polymers or copolymers of lactic acid.

Another subject of the invention is a packaging comprising this multilayer structure.

More generally, it is advantageously possible to use the composition according to the invention as a tie.

DETAILED DESCRIPTION OF THE INVENTION

The polymers (A) and (B) included in the composition according to the invention are biorenewable and/or biodegradable.

In order to determine whether a polymer is biorenewable, it is possible to use the standard ASTM D 6866.

These biorenewable polymers are characterized in that they comprise carbon of renewable origin, that is to say $^{14}C$. Specifically, all the samples of carbon taken from living organisms and in particular from the plant matter used to form the biorenewable polymers are a mixture of three isotopes: $^{12}C$, $^{13}C$ and $^{14}C$ in a $^{14}C/^{12}C$ ratio that is kept constant by continuous exchange of the carbon with the environment and which is equal to $1.2 \times 10^{-12}$. Although $^{14}C$ is radioactive and its concentration therefore decreases over time, its half-life is 5730 years, so that the $^{14}C$ content is considered to be constant from the extraction of the plant matter up to the manufacture of the biorenewable polymers and even up to the end of their use. For example, the polymer can be considered to be renewable when the $^{14}C/^{12}C$ ratio is greater than or equal to $1 \times 10^{-12}$.

The $^{14}C$ content of the biorenewable polymers can be measured, for example, according to the following techniques of liquid scintillation spectrometry or of mass spectrometry. These methods for measuring the $^{14}C$ content of the materials are described precisely in the standards ASTM D 6866 (especially D 6866-06) and in the standards ASTM D 7026 (especially 7026-04). These methods measure the $^{14}C/^{12}C$ ratio of a sample and compare it with the $^{14}C/^{12}C$ ratio of a reference sample of 100% renewable origin, in order to give a relative percentage of carbon of renewable origin in the sample.

The measurement method preferably used in the case of the biorenewable polymers is the mass spectrometry described in the standard ASTM D 6866-06 (accelerator mass spectroscopy).

The term "biodegradable" is applied to a material if it can be degraded by microorganisms. The result of this degradation is the formation of water, $CO_2$ and/or $CH_4$ and, optionally, by-products (residues, new biomass) that are not toxic for the environment. It is possible, for example, to use the standard EN 13432 in order to determine whether the material is biodegradable.

Regarding the biodegradable and/or biorenewable polymer (A), this can be chosen from:
- polylactides: for example, polymers and copolymers of lactic acid (PLA) or else polymers and copolymers of glycolic acid (PGA);
- polyhydroxyalkanoate homopolymers or copolymers (PHA): for example, PHB (polyhydroxybutyrate), PHBV (hydroxybutyrate/valerate copolymer, e.g. poly (3-hydroxybutyrate)-poly(3-hydroxyvalerate)), PHBHx (hydroxybutyrate/hexanoate copolymer, PHBO (hydroxybutyrate/hexanoate copolymer);
- polyalkylene succinates, PAS: such as for example, PES (polyethylene succinate, PBS (polybutylene succinate);
- other polymers such as PBSA (polybutylene succinate adipate), PBAT (polybutylene adipate terephthalate), PCL (polycaprolactone), PTT (polytrimethylene terephthalate); and
- thermoplastic starch (TPS) or starch-based blends.

A polymer chosen from PLA, PGA, PHA and PBS is preferred as polymer (A).

Among the biorenewable polymers, that is to say those derived from renewable resources, PLAs may be chosen from products with the trademark NATUREWORKS® from Cargill, with the trademark ECOPLASTIC® from Toyota, with the trademark LACEA® from Mitsui Chemical. Still among the polymers derived from renewable resources, PHBVs may be chosen from products with the trademark BIOPOL® (e.g. BIOPOL®D600G) from Zeneca, products from Biomer or products from Métabolix. The molecular weight of the PHBVs is approximately 20,000 to 2,000,000 grams per mole. Among the starch-based biorenewable materials, mention may be made, for example, of the product sold under the trademark MATERBI® from Novamont, the products sold under the trademark BIOPAR® from Biopolymer Technologies.

The thermoplastic starches which may be used in the present invention are of natural and plant origin.

Starches are mainly composed of amylose and/or amylopectin which are present at variable content levels depending on their botanical origin. These starches customarily have 3 OH functional groups per unit.

According to one embodiment, these starches may be modified. A modified starch is a starch from which one of the OH functional groups has reacted with a modifying molecule. For example, mention may be made, as a modified starch, of the starch modified by esterification (these are then referred to as starch esters). Starch esters are starches that are partially or completely modified by an esterification reaction on the OH functional groups.

These (modified or unmodified) starches may be destructured, pregelatinized or modified after addition of water and/or plasticizers described in Patent Application WO-90 10 019. The starch is then thermoplastic. As plasticizers, mention may be made, non-limitingly, of glycerol, diglycerol, polyglycerols, sorbitol and also mixtures thereof. The thermoplastic starch used in the present invention may contain up to 50 wt %, and preferably from 5 to 40 wt % of plasticizers. Mention may also be made of Patents U.S. Pat. Nos. 5,095,054, 5,889,135 and 5,436,078 which describe these thermoplastic starches. That application and the patents thereof are incorporated by reference into the present application.

Among the biodegradable polymers derived from fossil resources, mention may be made of the PBSs and PBSAs sold under the trademark BIONOLE® from Showadenko, the PTTs sold under the trademark Sorona® from DuPont, les PBATs sold under the trademark Ecoflex® from BASF, the PBSs and PBSAs sold under the trademark BIONOLE® from Showadenko. Mention may also be made of the PCLs sold, for example, under the trademark TONE® (e.g. TONE® UC-261, P-767 and P-787 PCL) from Dow.

Regarding the grafting monomer, this is chosen from unsaturated carboxylic acids or their functional derivatives.

Examples of unsaturated carboxylic acids are those having 2 to 20 carbon atoms, such as acrylic, methacrylic, maleic, fumaric and itaconic acids. The functional derivatives of these unsaturated carboxylic acids comprise the anhydrides, ester derivatives, amide derivatives, imide derivatives and metal salts (such as the alkali metal salts) of these unsaturated carboxylic acids.

Unsaturated dicarboxylic acids having 4 to 10 carbon atoms and their functional derivatives, particularly their anhydrides, are particularly preferred grafting monomers.

These grafting monomers comprise, for example, the following acids and their functional derivatives: maleic acid, fumaric acid, itaconic acid, citraconic acid, allylsuccinic acid, 4-cyclohexene-1,2-dicarboxylic acid, 4-methyl-4-cyclohexene-1,2-dicarboxylic acid, bicyclo[2.2.1]hept-5-ene-2,3-dicarboxylic acid, x-methylbicyclo[2.2.1]hept-5-ene-2,3-dicarboxylic acid, maleic anhydride, itaconic anhydride, citraconic anhydride, allylsuccinic anhydride, 4-cyclohexene-1,2-dicarboxylic anhydride, 4-methylene-4-cyclohexene-1,2-dicarboxylic anhydride, bicyclo[2.2.1]hept-5-ene-2,3-dicarboxylic anhydride and x-methylbicyclo[2.2.1]hept-5-ene-2,3-dicarboxylic anhydride.

Examples of other grafting monomers comprising $C_1$-$C_8$ alkyl esters or glycidyl ester derivatives of unsaturated carboxylic acids such as methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate and diethyl itaconate; amide derivatives of unsaturated carboxylic acids such as acrylamide, methacrylamide, maleamide, malediamide, N-ethyl maleamide, N,N-diethyl maleamide, N-butyl maleamide, N,N-dibutyl maleamide, fumaramide, fumardiamide, N-ethylfumaramide, N,N-diethylfumaramide, N-butylfumaramide and N,N-dibutylfumaramide; imide derivatives of unsaturated carboxylic acids such as maleimide, N-butylmaleimide and N-phenylmaleimide; and metal salts of unsaturated carboxylic acids such as sodium acrylate, sodium methacrylate, potassium acrylate and potassium methacrylate.

Mention may also be made, as grafting monomer, of oxazoline and vinylsilane. Maleic anhydride (abbreviated to MAH) is preferred.

Various known processes (reactive extrusion process, in solution, by irradiation or in the solid state) may be used to graft a functional monomer onto the polymer (A). By way of example, the grafting of (A) may be carried out in the melt state in an extruder in the presence of a radical initiator. Suitable radical initiators which may possibly be used comprise tert-butyl hydroperoxide, cumene hydroperoxide, diisopropylbenzene hydroperoxide, di-tert-butyl peroxide, tert-butylcumyl peroxide, dicumyl peroxide, 1,3-bis-(tert-butylperoxyisopropyl)benzene, acetyl peroxide, benzoyl peroxide, isobutyryl peroxide, bis(3,5,5-trimethylhexanoyl) peroxide and methyl ethyl ketone peroxide.

In the polymer (A) modified by grafting obtained in the abovementioned way, the amount of grafted monomer is less than 1% (<1%) by weight, preferably between 0.1 and 0.9% by weight and more preferably still between 0.2 and 0.8% by weight (0.2 and 0.8% excluded).

The amount of grafted monomer could, for example, easily be determined by a person skilled in the art by virtue of the infrared spectroscopy technique.

Regarding the polymer (B), this is an ungrafted biorenewable and/or biodegradable polymer, that is to say:

- identical to the polymer (A), said polymer (A) being defined above or a blend of ungrafted polymers, which are partially or completely biorenewable and/or biodegradable and partially or completely identical to the polymers (A), the polymers (A) being defined above;
- different from said polymer (A) but compatible with said polymer (A), or a blend of ungrafted polymers, which are partially or completely biorenewable and/or biodegradable, different from said polymers (A) but compatible with said polymers (A), the term "compatible" being defined above; and
- the polymer (B) being chosen from the various polymers (A) defined previously.

Regarding the component (C), this is a polymer, an oligomer, a prepolymer or a molecule having at least 5 carbon atoms.

As softener, mention may be made of:

- polyethers, such as polyethylene glycol (abbreviated to PEG) or else polytrimethylene ether glycol (abbreviated to PO3G);
- core-shell type compounds. Examples of "core-shell" copolymers that can be used within the scope of the present invention are especially described in documents U.S. Pat. Nos. 6,809,151, 7,022,768 and 7,119,152. Mention may be made, for example, of MBSs (methyl methacrylate/butadiene/styrene) sold by Arkema under the trademark CLEARSTRENGTH® or MMA-buA-MMAs (acrylic impact modifiers) sold by Arkema under the trademark DURASTRENGTH®.
- copolymers or blends of copolymers of ethylene, unsaturated carboxylic acid ester or vinyl ester, and optionally other unsaturated functional monomers such as maleic anhydride (MAH), glycidyl methacrylate (GMA), acrylic acid or methacrylic acid. It could be possible, for example, to use ethylene/vinyl acetate copolymers (abbreviated to EVA), copolymers of ethylene/acrylic derivatives such as ethylene/methyl acrylate (abbreviated to EMA) or ethylene/butyl acrylate (abbreviated to EBA), terpolymers of ethylene/vinyl acetate/maleic anhydride (OREVAC T®), of ethylene/acrylic esters/maleic anhydride (LOTADERr®), of ethylene/acrylic esters/glycidyl methacrylate or else of ethylene/acrylic esters/(meth)acrylic acid; and
- copolymers or blends of copolymers of ethylene and α-olefins grafted with a functional monomer comprising at least one reactive function, the α-olefins having 3 to 30 carbon atoms comprising propylene, 1-butene, 1-pentene, 3-methyl-1-butene, 1-hexene, 4-methyl-1-pentene, 3-methyl-1-pentene, 1-octane, 1-decene, 1-dodecene, 1-tetradecene, 1-hexadecene, 1-octadecene, 1-eicosene, 1-docosene, 1-tetracosene, 1-hexacosene, 1-octacosene and 1-triacontene.

The expression "material (D) comprising starch" is understood to mean the starch, modified starch or thermoplastic starch described previously.

In addition, other components known in the art may be added to the grafted polymers of this invention to increase the properties of the final material. Among these components, mention may be made of the additives normally used during the processing of polymers having, for example, content levels between 10 ppm and 50,000 ppm, such as antioxidants, UV stabilizers, processing aids such as fatty amides, stearic acid and its salts, fluoropolymers known as agents for avoiding extrusion defects, antifogging agents, antiblocking agents such as silica or talc. Other types of additives may also be incorporated to provide specific desired properties. For example, antistatic agents, nucleating agents, colorants will be mentioned.

The invention also relates to a structure comprising at least one layer (L) of the composition.

Advantageously, the layer (L) has a thickness within the range extending from 1 to 500 μm.

According to the invention, the structure may comprise various successive layers, at least one of which is the layer (L) (it is then said to be a "multilayer structure"). As regards the number of layers of the multilayer structure according to the invention, it is an integer greater than or equal to 2, preferably less than or equal to 15, preferably within the range extending from 3 to 9.

It is possible to have a structure of layer (L)/layer (X) type, layer (L)/layer (Y) type, or even a structure of layer (X)/layer (L)/layer (Y) type:

- the layer (L) being the tie layer of the present invention;
- the layer (X), which is compatible with the tie layer (L), advantageously being a layer of biorenewable and/or biodegradable polymer or of a blend of partially or completely biorenewable and/or biodegradable polymers, said polymer(s) being chosen from the polymers (A) stated below. Preferably, they are polylactides: for example, polymers and copolymers of lactic acid (PLA) or polymers and copolymers of glycolic acid (PGA);
- the layer (Y), according to one embodiment of the invention of different nature from the layer (X), advantageously being:

(i) a layer of a biorenewable and/or biodegradable polymer or of a blend of partially or completely biorenewable and/or biodegradable polymers, said polymer(s) being chosen from the polymers (A) stated below. Preferably, they are polylactides: for example, polymers and copolymers of lactic acid (PLA) or polymers and copolymers of glycolic acid (PGA);

(ii) a layer of nitrogen-containing or oxygen-containing polar resin such as a layer of resin chosen from polyamides, copolyamides, saponified vinyl acetate/ethylene copolymers (abbreviated to EVOH), polyesters and copolyesters of renewable and/or biodegradable nature or mixtures thereof (for example, with thermoplastic starch) or else polystyrene;

(iii) a metal layer.

In the present application, the polymers are considered to be "compatible" when there is an affinity between them such that they may develop an excellent adhesion with respect to one another when they are brought into contact in the melt state. Similarly, the contiguous layers of a multilayer structure are said to be "compatible" when there is an affinity between them such that they may develop an excellent adhesion with respect to one another when they are brought into direct contact in the melt state.

For example, two polymers (or two contiguous layers of a multilayer structure) may be considered to have an excellent adhesion (that is to say that they are compatible) when two layers having a thickness of 200 μm of each of these polymers are brought into contact in the molten state by coextrusion of a two-layer film, these 2 layers having, 24 h after cooling at 20° C., a peel strength greater than or equal to 0.5 N/15 mm in the 90° peel test according to the ISO 8510-1 standard, this peel strength preferably being greater than or equal to 5 N/15 mm.

Polyamides are polymers comprising at least one amide functional group in the repeating unit of the polymer. As examples of polyamides (PA), mention may be made of PA-6, PA-6, 6, PA-12 and PA-11, which is a biorenewable polyamide (produced by Arkema under the trade mark Rilsan®). Reference may be made to the patent application and particularly that filed under the number PCT/FR/08/050251 which relates to polyamides of renewable origin.

It would not be outside the scope of the invention if, in a layer (X)/layer (L)/layer (Y) type structure:
- the layer (X) and/or the layer (Y) are/is partially or completely biorenewable and/or biodegradable;
- the layer (X) and/or the layer (Y) are/is not biorenewable and/or biodegradable;
- the layer (X) is partially or completely biorenewable and/or biodegradable and the layer (Y) is not biorenewable and/or biodegradable; and
- the layer (Y) is partially or completely biorenewable and/or biodegradable and the layer (X) is not biorenewable and/or biodegradable.

In a particularly advantageous manner, the multilayer structure of layer (X)/layer (L)/layer (Y) type comprises:
- a layer (X) made from a polymer or copolymer of lactic acid (PLA);
- a layer (Y) composed of a saponified ethylene/vinyl acetate copolymer (abbreviated to EVOH); and
- advantageously, the tie layer (L) is made with a composition comprising the MAH-grafted PLA as polymer (A), the ungrafted PLA as polymer (B) and a softener (C).

The expression "metal layer" is preferably understood to mean a layer of metal, of a metal alloy, of a metal oxide, or of metals.

Each of the non-metallic layers of the structure may comprise, in addition, the compounds already cited chosen from antioxidants, UV stabilizers, processing aids, agents for avoiding extrusion defects, antifogging agents, antiblocking agents, antistatic agents, nucleating agents and colorants. These agents may be added to each of the layers in the same proportions by weight as those already described for the composition according to the invention.

As regards the antifogging agents, it is possible to advantageously add them in proportions ranging from 0.1 to 5% by weight of the layer comprising them.

Preferably, when one of the layers of the multilayer structure comprises antifogging agents, it is an outer layer. The expression "outer layer" is understood to mean a layer of the structure for which at least one side is not in contact with any of the other layers of the structure. Water condenses fess on the structure than when one of the layers does not contain any, which enables, for example, the advantageous use of this structure in the field of packagings. Preferably, the antifogging agent is in the outer layer of the structure which is in contact with the inside of the packaging.

The structure may take the form, for example, of a sheet, a tube, a film, a cup or a tray. Preferably, the structure takes the form of a film or a sheet.

The term "film" is understood to mean a structure having a thickness of less than or equal to 300 μm. The term "sheet" is understood to mean a structure having a thickness greater than 300 μm and preferably less than or equal to 2 mm.

The structure may form, alone or in combination with another structure, a packaging.

These structures may be obtained by the conventional techniques of compression moulding, injection moulding, blown film extrusion, extrusion of hollow bodies which allows, for example, bottles to be obtained (also called blow moulding), extrusion laminating, extrusion coating, flat-film extrusion (also called extrusion casting) or else sheet extrusion by calendaring, these sheets possibly or possibly not being subsequently thermoformed, for example to form trays or cups.

All of these techniques are well known to a person skilled in the art, who will know how to adapt the operating conditions of the various techniques (temperature, rotational speed of the screws, etc.) in order to form the structure according to the invention having the desired shape and desired thicknesses.

Preferably, the structure is obtained by a coextrusion process.

In one preferred process for manufacturing a structure according to the invention, a step of coextrusion of the various layers of the structure is carried out then a step of compression moulding or of post-curing is carried out. This post-curing or compression-moulding step may be carried out, for example, at a temperature within the range extending from 100 to 200° C. and preferably for a time between 1 and 10 minutes. In this case, the adhesion between the various layers is improved.

The present invention is illustrated in more detail by the following non-limiting example.

EXAMPLE 1

A tie composition was produced in a Leistritz twin-screw extruder comprising:
- 40 wt % of PLA 2002D (sold under the trademark NATUREWORKS® by Cargill) grafted with maleic anhydride, the grafting being carried out by reactive extrusion in a Leistritz twin-screw extruder (conditions: throughput=15 kg/h, temperature=200° C., screw speed=150 rpm, DHPB peroxide=0.8%, amount of MAH introduced=0.9%);
- 40 wt % of PLA 2002D; and
- 20 wt % of ethylene/ethylacrylate/maleic anhydride terpolymer with 28 wt % of ethyl acrylate and 2 wt % of MAH, synthesized by high-pressure radical polymerization and having a melting point $(T_m)$=65° C.

This tie was then coextruded with a layer of PLA 2002D and a layer of EVOH (EVOH=SOARNOL® 3803, 38% ethylene).

The coextruded structure with a total thickness of 100 μm had the following distribution: 30 μm PLA/10 μm tie/50 μm EVOH. This structure was produced in a Collin® extruder in cast film configuration. The extruder was equipped with a feed block (configuration: 3 layers) and with a sheet die having a gap of 500 μm and having a width of 25 cm.

Coextrusion trials were carried out with the following parameters:
- the line speed was 25 m/min;
- the temperature of the PLA layer was 220° C.;
- the temperature of the intermediate tie layer was 220° C.; and
- the temperature of the EVOH layer was 230° C.

The average T peel strength between the tie layer and that of EVOH was 4.2 N (standard deviation of 0.2 N).

The invention claimed is:

1. A multilayer structure comprising a binder layer (L) of a composition comprising (the total making 100 %):
   1 to 99 % by weight of a polymer (A) or of a blend of polymers (A), said polymer or polymers (A) being:
   biorenewable and/or biodegradable; and
   grafted by a functional grafting monomer comprising at least one reactive function, the grafting ratio being in the range of 0.1 to 0.98 % by weight of grafted polymer(s) (A);
   99 to 1 % by weight of a polymer (B) or of a blend of polymers (B), said polymer or polymers (B) being:
   ungrafted;
   biorenewable and/or biodegradable; and identical to said polymer(s) (A) or compatible with said polymer(s) (A);

0 to 50 % by weight of a component (C) a softener; and 0 to 50 % by weight of a material (D) comprising starch, wherein the layer (L) is directly linked to a layer (X) and also directly linked to a layer (Y), said multilayer structure having a layer (X)/layer (L)/layer (Y) type structure, wherein layer (X) is a polymer, wherein the layer (L) adhered to layer (X) has a peel strength greater than or equal to 0.5N/15mm in the 90° peel test according to the ISO 8510-1 standard when two layers each having a thickness of 200 µm are brought into contact in the molten state by coextrusion of a two-layer film, these 2 layers having, 24 h after cooling at 20° C., wherein the polymer (A) is selected from the group consisting of polyhydroxyalkanoate homopolymers or copolymers (PHA), polyalkylene succinates (PAS), polybutylene succinate adipate (PBSA), polybutylene adipate terephthalate (PBAT), polycaprolactone (PCL), polytrimethylene terephthalate (PTT) and thermoplastic starch (TPS).

2. The multilayer structure according to claim 1, wherein the grafting ratio of the polymer (A) is between 0.1 and 0.9 % by weight of grafted polymer (A).

3. The multilayer structure according to claim 1, wherein the component (C) is selected from the group consisting of:
polyethers, polyethylene glycol (PEG), polytrimethylene ether glycol (PO3G);
core-shell type compounds;
copolymers or blends of copolymers of ethylene, unsaturated carboxylic acid ester and optionally other unsaturated functional monomers; and
copolymers or blends of copolymers of ethylene and α-olefins grafted with a functional monomer comprising at least one reactive function, the α-olefins having 3 to 30 carbon atoms.

4. The multilayer structure according to claim 1, comprising thermoplastic starch as material (D).

5. Multilayer structure according to claim 1, wherein the layer (X)/layer (L)/layer (Y) type structure is selected from one of the following:
the layer (X) and the layer (Y) being partially or completely biorenewable and/or biodegradable;
the layer (X) and the layer (Y) not being biorenewable and/or biodegradable;
the layer (X) being partially or completely biorenewable and/or biodegradable and the layer (Y) not being biorenewable and/or biodegradable; or
the layer (Y) being partially or completely biorenewable and/or biodegradable and the layer (X) not being biorenewable and/or biodegradable.

6. Multilayer structure according to claim 5, wherein the layer (Y), is of a different nature than the layer (X), being either (i) a layer of a biorenewable and/or biodegradable polymer or of a blend of partially or completely biorenewable and/or biodegradable polymers or (ii) a layer of nitrogen-containing or oxygen-containing polar resin chosen from polyamides, copolyamides, saponified vinyl acetate/ethylene copolymers (abbreviated to EVOH), polyesters and copolyesters of renewable and/or biodegradable nature or mixtures thereof or (iii) a metal layer.

7. Multilayer structure according to claim 5, wherein the layer (X) is a layer of polymers or copolymers of lactic acid.

8. The multilayer structure according to claim 1, wherein the composition comprises from 5 to 35% by weight of a component (C).

9. The multilayer structure according to claim 1, wherein the composition comprises from 2 to 20% by weight of a component (D).

10. The multilayer structure according to claim 1, wherein the functional grafting monomer is chosen from unsaturated carboxylic acids or their functional derivatives.

11. A multilayer structure comprising a binder layer (L) of a composition comprising (the total making 100 %):
1 to 99 % by weight of a polymer (A) or of a blend of polymers (A), said polymer or polymers (A) being:
biorenewable and/or biodegradable; and
grafted by a functional grafting monomer comprising at least one reactive function, the grafting ratio being in the range of 0.1 to 0.98% by weight of grafted polymer(s) (A);
99 to 1 % by weight of a polymer (B) or of a blend of polymers (B), said polymer or polymers (B) being:
ungrafted;
biorenewable and/or biodegradable; and
identical to said polymer(s) (A) or compatible with said polymer(s) (A);

0 to 50 % by weight of a component (C) a softener; and 0 to 50 % by weight of a material (D) comprising starch, wherein the layer (L) is directly linked to a layer (X) and also directly linked to a layer (Y), said multilayer structure having a layer (X)/layer (L)/layer (Y) type structure, wherein layer (X) is a polymer, wherein the layer (L) adhered to layer (X) has a peel strength greater than or equal to 0.5 N/15 mm in the 90° peel test according to the ISO 8510-1 standard when two layers each having a thickness of 200 µm are brought into contact in the molten state by coextrusion of a two-layer film, these 2 layers having, 24 h after cooling at 20° C., wherein the polymer (A) is selected from the group consisting of polyethylene succinate (PES), polybutylene succinate (PBS), polyhydroxybutyrate (PHB), hydroxybutyrate/valerate copolymers (PHBV), poly(3-hydroxybutyrate)-poly(3-hydroxyvalerate), hydroxybutyrate/hexanoate copolymers PHBHx) and hydroxybutyrate/hexanoate copolymers (PHBO).

12. A multilayer structure comprising a binder layer (L) of a composition comprising (the total making 100%):
1 to 99% by weight of a polymer (A) or of a blend of polymers (A), said polymer or polymers (A) being:
biorenewable and/or biodegradable; and
grafted by a functional grafting monomer comprising at least one reactive function, the grafting ratio being in the range of 0.1 to 0.98% by weight of grafted polymer(s) (A);
99 to 1% by weight of a polymer (B) or of a blend of polymers (B), said polymer or polymers (B) being:
ungrafted;
biorenewable and/or biodegradable; and
identical to said polymer(s) (A) or compatible with said polymer(s) (A);

0 to 50% by weight of a component (C) a softener; and 0 to 50% by weight of a material (D) comprising starch, wherein the layer (L) is directly linked to a layer (X) and also directly linked to a layer (Y), said multilayer structure having a layer (X)/layer (L)/layer (Y) type structure, wherein layer (X) is a polymer, wherein the layer (L) adhered to layer (X) has a peel strength greater than or equal to 0.5 N/15mm in the 90° peel test according to the ISO 8510-1 standard when two layers each having a thickness of 200 µm are brought into contact in the molten state by coextrusion of a two-layer film, these 2 layers having, 24 h after cooling at 20° C., wherein the functional grafting monomer is chosen from unsaturated carboxylic acids or their functional derivatives.

13. The multilayer structure according to Claim 12, wherein the polymer (A) is chosen from polylactides.

14. The multilayer structure according to claim 12, wherein the functional grafting monomer is chosen from (i) acrylic, methacrylic, maleic, fumaric and itaconic acids and (ii) anhydrides, ester derivatives, amide derivatives, imide derivatives and metal salts of said acids.

15. The multilayer structure according to claim 14, wherein the functional grafting monomer is maleic anhydride.

16. The multilayer structure according to Claim 12, wherein the polymer (B) is chosen from polylactides.

17. Packaging comprising a multilayer structure comprising at least a layer (L) of a composition comprising (the total making 100%):
- 1 to 99% by weight of a polymer (A) or of a blend of polymers (A), said polymer or polymers (A) being:
  biorenewable and/or biodegradable; and
  grafted by a functional grafting monomer comprising at least one reactive function, the grafting ratio being in the range of 0.1 to 0.98% by weight of grafted polymer(s) (A);
- 99 to 1% by weight of a polymer (B) or of a blend of polymers (B), said polymer or polymers (B) being:
  ungrafted;
  biorenewable and/or biodegradable; and
  identical to said polymer(s) (A) or compatible with said polymer(s) (A);
- 0 to 50% by weight of a component (C) a softener; and
- 0 to 50% by weight of a material (D) comprising starch, wherein the layer (L) is directly linked to a layer (X) and also directly linked to a layer (Y), said multilayer structure having a layer (X)/layer (L)/layer (Y) type structure, wherein layer (X) is a polymer, wherein the layer (L) adhered to layer (X) has a peel strength greater than or equal to 0.5 N/15mm in the 90° peel test according to the ISO 8510-1 standard when two layers each having a thickness of 200 µm are brought into contact in the molten state by coextrusion of a two-layer film, these 2 layers having, 24 h after cooling at 20° C., wherein the polymer (A) is selected from the group consisting of polyhydroxyalkanoate homopolymers or copolymers (PHA), polyalkylene succinates (PAS), polybutylene succinate adipate (PBSA), polybutylene adipate terephthalate (PBAT), polycaprolactone (PCL), polytrimethylene terephthalate (PTT) and thermoplastic starch (TPS).

* * * * *